United States Patent
Morales et al.

(10) Patent No.: US 11,733,945 B2
(45) Date of Patent: Aug. 22, 2023

(54) METHODS FOR PROCESSING DOCUMENTS USING RULES IN VARIABLE DATA PRINTING OPERATIONS

(71) Applicant: Kyocera Document Solutions Inc., Osaka (JP)

(72) Inventors: Javier A. Morales, Rochester, NY (US); Timothy Sterling Geesman, Los Angeles, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/495,109

(22) Filed: Oct. 6, 2021

(65) Prior Publication Data

US 2023/0108301 A1    Apr. 6, 2023

(51) Int. Cl.
*G06F 3/12* (2006.01)
(52) U.S. Cl.
CPC .......... *G06F 3/1243* (2013.01); *G06F 3/1205* (2013.01); *G06F 3/1208* (2013.01)

(58) Field of Classification Search
CPC ..... G06F 3/1243; G06F 3/1205; G06F 3/1208
See application file for complete search history.

(56) References Cited

U.S. PATENT DOCUMENTS

| | | | |
|---|---|---|---|
| 7,468,805 B2 | 12/2008 | Lo et al. | |
| 2005/0094205 A1* | 5/2005 | Lo | G06F 40/106 358/1.18 |
| 2005/0094207 A1* | 5/2005 | Lo | G06F 40/174 358/1.18 |
| 2008/0186537 A1 | 8/2008 | Isobe | |
| 2020/0314250 A1* | 10/2020 | Kobayashi | H04N 1/00331 |

* cited by examiner

*Primary Examiner* — Iriana Cruz
(74) *Attorney, Agent, or Firm* — Millen, White, Zelano & Branigan, P.C.; William Nixon

(57) ABSTRACT

Rules for variable data printing operations are defined using statements having text or image variables used in an object for a document template. Statements include conditions that evaluate content or data for the variables to determine whether the resulting content or data for the object is modified. Multiple statements are used within a rule, including those with complex expressions. The rules allow the generations of variety of documents that include different and fixed content.

10 Claims, 11 Drawing Sheets

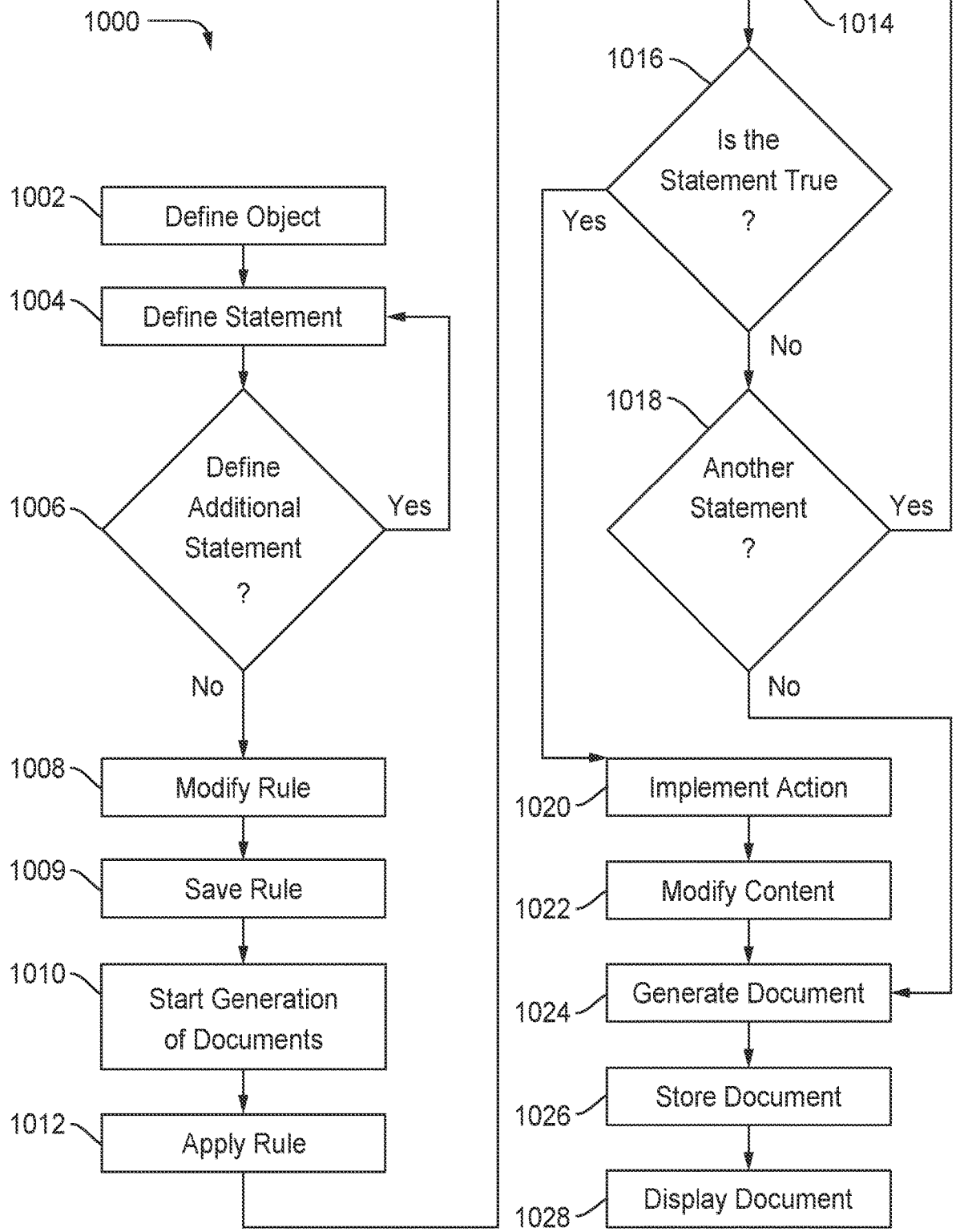

METHODS FOR PROCESSING DOCUMENTS USING RULES IN VARIABLE DATA PRINTING OPERATIONS

FIELD OF THE INVENTION

The present invention relates to processing documents used in variable data printing operations. More particularly, the present invention relates to defining and using rules for variable data printing operations.

DESCRIPTION OF THE RELATED ART

A challenge for advanced variable data printing (VDP) composition is making sure that the design template works in all variety of the documents used in the subject case. VDP printing operations, however, may not be able to implement complex rules or compositions based on a large variety of text objects or in conjunction with image objects.

SUMMARY OF THE INVENTION

A method for variable data printing operations is disclosed. The method includes defining a text object within a document template for a plurality of documents. The text object includes a first text variable that dynamically changes between the plurality of documents. The method also includes evaluating a value for a first text variable according to a text object rule having a first statement. The method also includes implementing an action to modify a text object format for the text object according to the first statement based on the value for the first text variable. The method also includes inserting text data according to the modified text object format into the text object for the document. The method also includes displaying the document with the text object including the text data according to the modified text object format.

A method for variable data printing operations is disclosed. The method includes defining an image object with an image placeholder within a document template for a plurality of documents. The method also includes evaluating an image variable associated with the document according to an image object rule. The image variable differs between the plurality of documents. The method also includes retrieving an image related to the image object rule according to the image variable. The method also includes placing the image within the document at location defined by the image placeholder. The method also includes displaying the document with the image.

A method for variable data printing operations is disclosed. The method includes defining an object within a document template for a plurality of documents. The object is subject to a rule. The method also includes defining a first statement of the rule. The first statement having a first expression for a condition regarding a first variable defined in the object. The first variable relates to content within data records for generating the plurality of documents. The method also includes applying the first statement of the rule to content for the first variable within each record of the data records. The method also includes, for each record, implementing a first action according to a result of the application of the first statement of the rule. The first action modifies content placed in the object or a format of the object for a document corresponding to the record.

BRIEF DESCRIPTION OF THE DRAWINGS

Various other features and attendant advantages of the present invention will be more fully appreciated when considered in conjunction with the accompanying drawings.

FIG. 10 illustrates a flowchart for implementing a rule having multiple statement for variable data printing operations according to the disclosed embodiments.

DETAILED DESCRIPTION OF THE PREFERRED EMBODIMENTS

Figure 1:
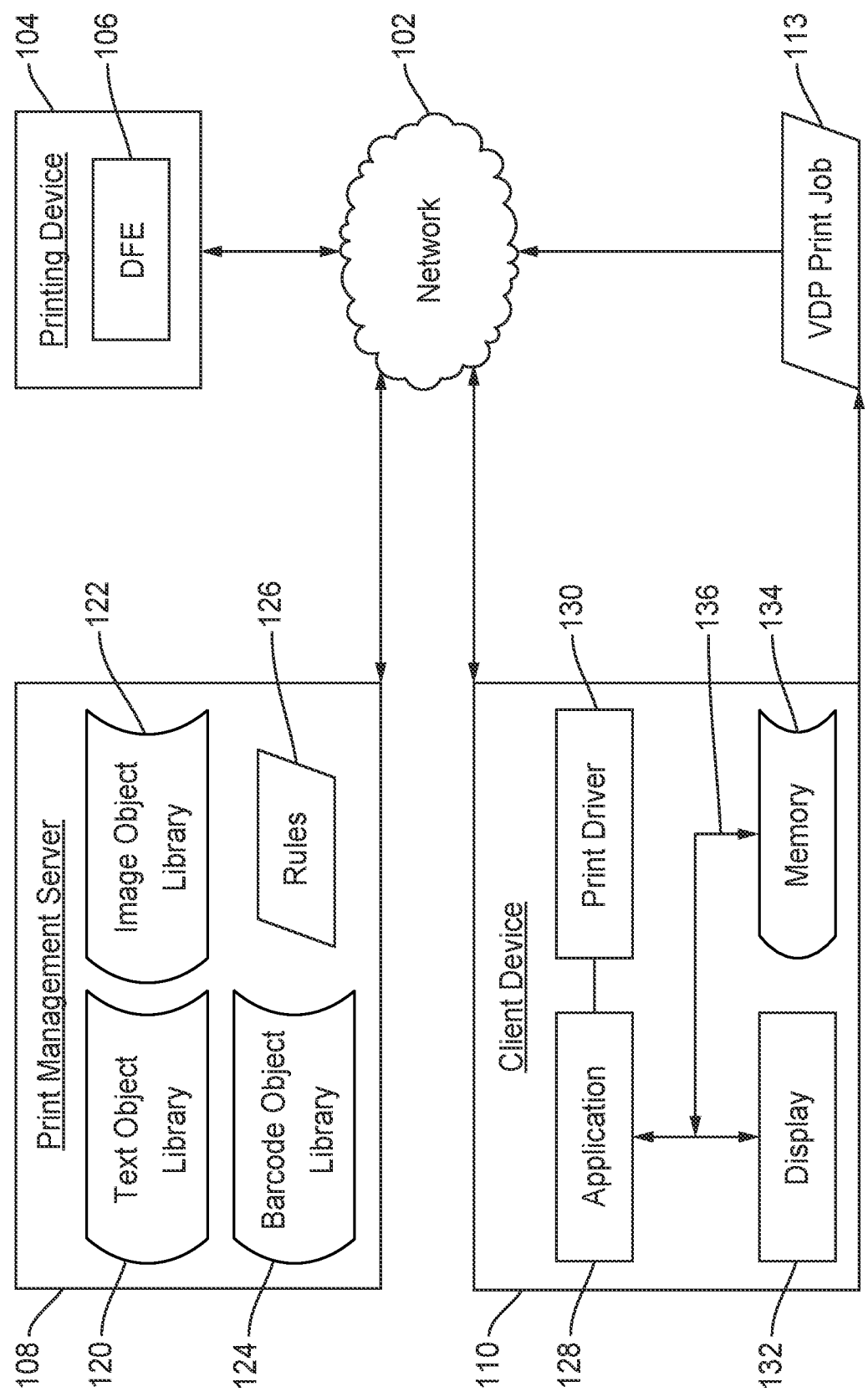
FIG. 1 illustrates a block diagram of a printing system for variable data printing operations according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments may add a "smart filter" option to a VDP application. The smart filter option would identify the records shown to the user according to rules and criteria. The records would be added to the set of interest based on the rules and criteria.

Records may include documents having text variables. The disclosed embodiments may add the shortest and the longest record for each text variable. The disclosed embodiments also may add a record for each Unicode block found in the data. The record may be added according to one of the several criteria or rules. The record having the Unicode block may be added as being the shortest or the longest record for each Unicode block. The disclosed embodiments also may add the first record found for each Unicode block. The disclosed embodiments also may add a random record form the records that use a give Unicode block. The disclosed embodiments also may give preference to records that use multiple Unicode blocks in order to minimize the total number of records in the smart preview. The disclosed embodiments also may add records that use multiple Unicode blocks, except those using Basic Latin and another block.

The documents may include text objects that use text variables. Examples may include name, address, city, state, location code, and the like. The disclosed embodiments seek to identify outliers in the data for the preview set. Thus, the disclosed embodiments may add, for each text object that uses variables, the records with the shortest and longest variable combinations. For example, if a text object has variables A, B, and C, then the shortest and longest records for the following combinations should be added: A+B, A+C, B+C, and A+B+C.

For each text object that uses rules, the disclosed embodiments add a record for each condition in the rule. For example, is a text object has a rule that states if (A), else if (B), else if (C), else if (D), then the disclosed embodiments would add records for which A, B, C, or D are true. It also would add rules for when none of these conditions are true.

The disclosed embodiments also may take into account image objects having image variables. Unique image files may be inserted into the document template based on criteria or rules. The disclosed embodiments add a record for each unique image file, unless each record uses a unique image file. Uniqueness may be evaluated using the complete image uniform resource locator (URL). If not covered by the above, then the disclosed embodiments may add a record for each image object that uses variables. For each image object that uses rules, the disclosed embodiments add a record for each condition in the rule.

The disclosed embodiments also may take into account barcode objects having barcode variables. Most barcode variations may be covered by filtering for text variables as disclosed above. If the barcode value is a URL, then the disclosed embodiments add a record for each unique URL, unless each record uses a unique URL. Uniqueness may be evaluated using the complete URL in the barcode. For each barcode object the uses variables, the disclosed embodiments add the records with the shortest and longest variable combinations. For each barcode object that uses rules, the disclosed embodiments add a record for each condition in the rule.

The document also may include document pages that uses rules. For each document page using rules, the disclosed embodiments add a record for each condition in the rule. A preview may be shown to the user in the same manner as traditional VDP previews, with some important differences. The records are filtered according to the criteria and rules disclosed above. Each record displays information stating why it is included in the preview. This feature will help users understand what they should be evaluating when they view each record in the preview.

The disclosed embodiments also provide for using rules to dynamically change the content or the formatting of the content in the document being generated as part of the VDP print job. The disclosed application may add a text block, or object, in the document. The object is formatted, or customized. Variable text data is inserted into the text block. The disclosed embodiments adapt the document composition to the data. One may then create a rule related to the variable text data. When analyzing a record, if the statement of the rule is true, then override the formatting for the content and apply the result. In other words, if the statement is true, then change the content or the content format. Rules also may be created in an order. This order may be changed during creation of the document template used for the records. The rule may be saved under a rule name Image rules also may be created to insert images according to the rule. If the statement in the rule is true, then an image may be inserted into the document. An image placeholder may be used in the document template to indicate where to place the image, if the statement, or condition, is true.

The disclosed embodiments also may use complex expression language. For example, the disclosed embodiments may use eight different expressions or string comparison to define a statement in a rule. The expressions may use logical operators in setting the conditions for the statement. Thus, the disclosed embodiments define or place an object according to a rule having complex expressions using variables.

FIG. 1 depicts a printing system 100 for variable data printing operations according to the disclosed embodiments. Printing system 100 may be located in a print shop or other environment suitable for production printing operations. Printing system 100 includes one or more printing devices 104 that receive print jobs from one or more client devices 110. Further, printing operations may be managed by print management server 108. As shown in FIG. 1, VDP print job 113 is submitted from client device 110 to printing device 104, but it also may be submitted to print management server 108 which selects printing device 104 to complete the job.

Client device 110 may be capable of executing applications and programs 128 to generate documents and files, such as, for example, a computer, a laptop computer, mobile device or tablet, smart phone, kiosk, and the like. Client device 110 may send print jobs to printing device 104 over one or more networks 102 implemented within printing system 100 using print driver 130. Print driver 130 converts the data generated or created by application 128 into a format that printing device 104 can understand. The result is print job 113. Additional client devices may be connected to printing device 104, which submit print jobs to printing device 104 or print management server 108.

Variable designer application 128 may be an application that enables VDP printing operations. Application 128 may differ from a conventional desktop publishing application in that it implements a variable area on documents. The variable areas, or objects, include setting of unique information so that contents to be displayed can be changed according to information provided in data records as well as from libraries or a database. The unique information can be expressed by a conditional relationship representing a relationship between a variable, or attribute, of each area and data provided to application 128.

A user may execute application 128 to generate VDP print job 113, as disclosed in greater detail below. A preview of a set of documents corresponding to VDP print job 113 may be displayed at client device 110 in display 132. Memory 134 may store VDP print job 113 as well as various objects and data used to generate the print job. The components within client device 110 may be connected by bus 136 to receive and transmit data and signals.

Network 102 may be used by system 100 to exchange data between the devices within system 100. The devices are configured to communicate with network 102 over a physical communications interface or layer such as air interfaces and/or a direct wired connection. Air interfaces may be an given cellular communications protocol (e.g., GSM, CDMA, W-CDMA, EVDO, eHRPD, EDGE, 4G LTE, 5G LTE, 5G NR/New Radio, etc.) and, or a wireless IP protocol (e.g., IEEE 802.11 family) Alternatively, network 102 may be a local area network, wide area network, an ad-hoc network. Network 102 allows printing device 104 and client device 110 to exchange data using the appropriate protocol.

Printing device 104 is disclosed in greater detail below. It includes embedded digital front end (DFE) 106, or a printing device controller, that is the workflow touchpoint which accepts a print job, or print file, commonly a PDF or PostScript file. DFE 106 converts the file of a received print job into a format that print engine 260, disclosed below, can use to lay down the content of the document corresponding to the print job on a media. DFE 106 may include a raster image processor (RIP) as well as other components. DFE 106 also may schedule when a received print job is processed and other operations related to printing operations.

Print management server 108 may interact with printing device 104 and client device 110 to perform variable data printing operations. In some embodiments, VDP print job 113 is submitted to print management server 108, which then forwards the print job to printing device 104. Print management server 108 may include libraries and other data storage components to enable application 128 to generate VDP print job 113.

For example, print management server 108 may include text object library 120 that stores text variables, data for filling a text object within one or more documents in VDP print job 113, Unicode blocks, and other information to be used in filling the text object. It also includes image object library 122 that includes image variables to be used within one or image objects within the documents. The image variables may include a unique image file that may be retrieved using a URL. Print management server 108 also includes barcode object library 124 that includes barcode variables to be used within one or more barcode objects within the documents. The barcode variables may include a unique barcode file that may be retrieved using a URL. Server 108 also includes rules 126 that define what information may be displayed or printed within one or more of the objects embedded in the documents of VDP print job 113.

In some embodiments, print management server 108 is not within printing system 100. In such a case, the functions and features of print management server 108 are provided at client device 110 in conjunction with application 128 or implemented at printing device 104 using DFE 106. For example, libraries 120, 122, 124, and 126 may be implemented at client device 110.

Figure 2:
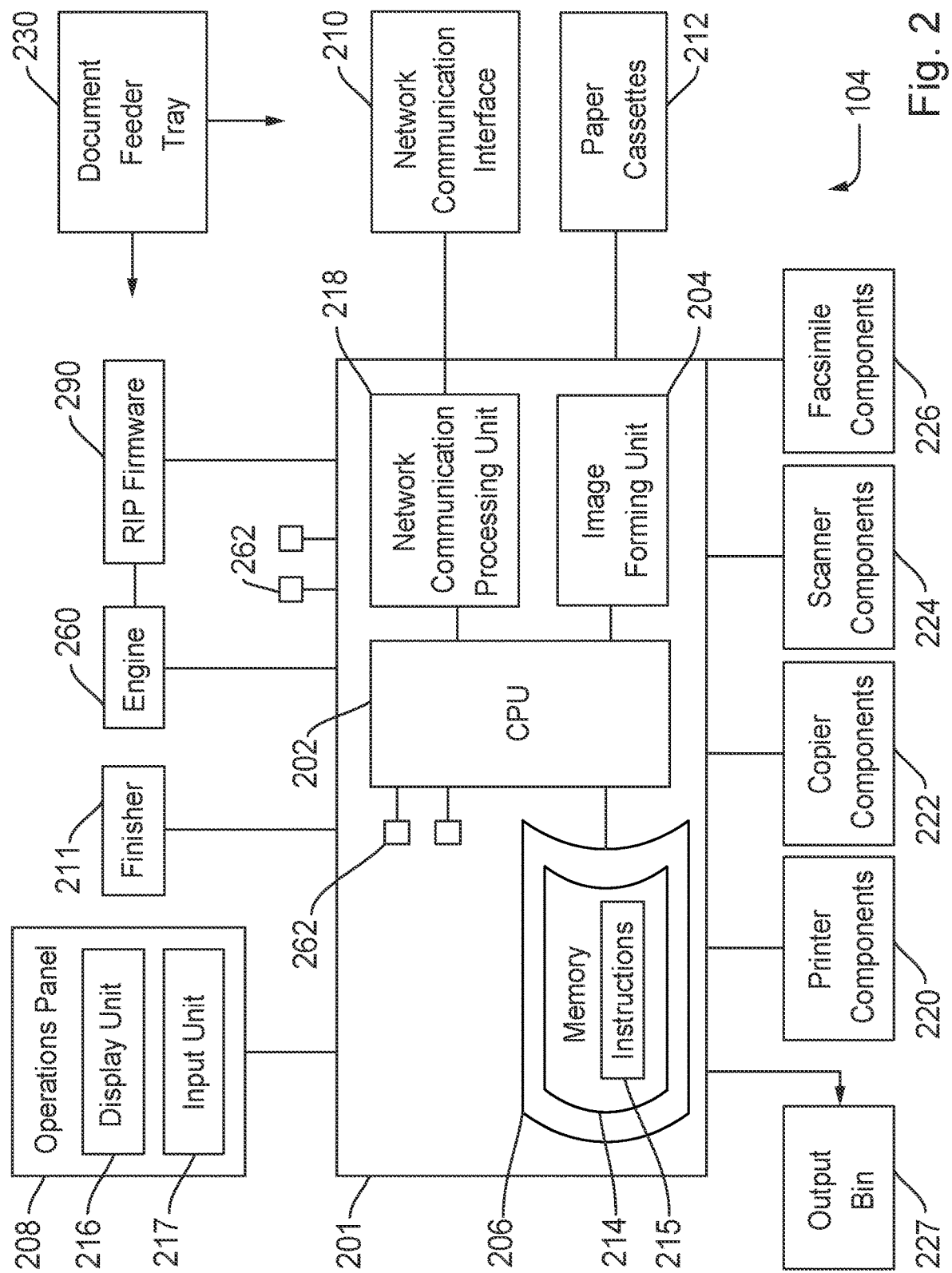
FIG. 2 illustrates a block diagram of components of the printing device for use within the printing system according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from client device 110 and print management server 108, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused.

Document processor input feeder tray 230 may include the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220.

As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with client devices 110 and 112 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from client device 110 and print management server 108.

Figure 3:
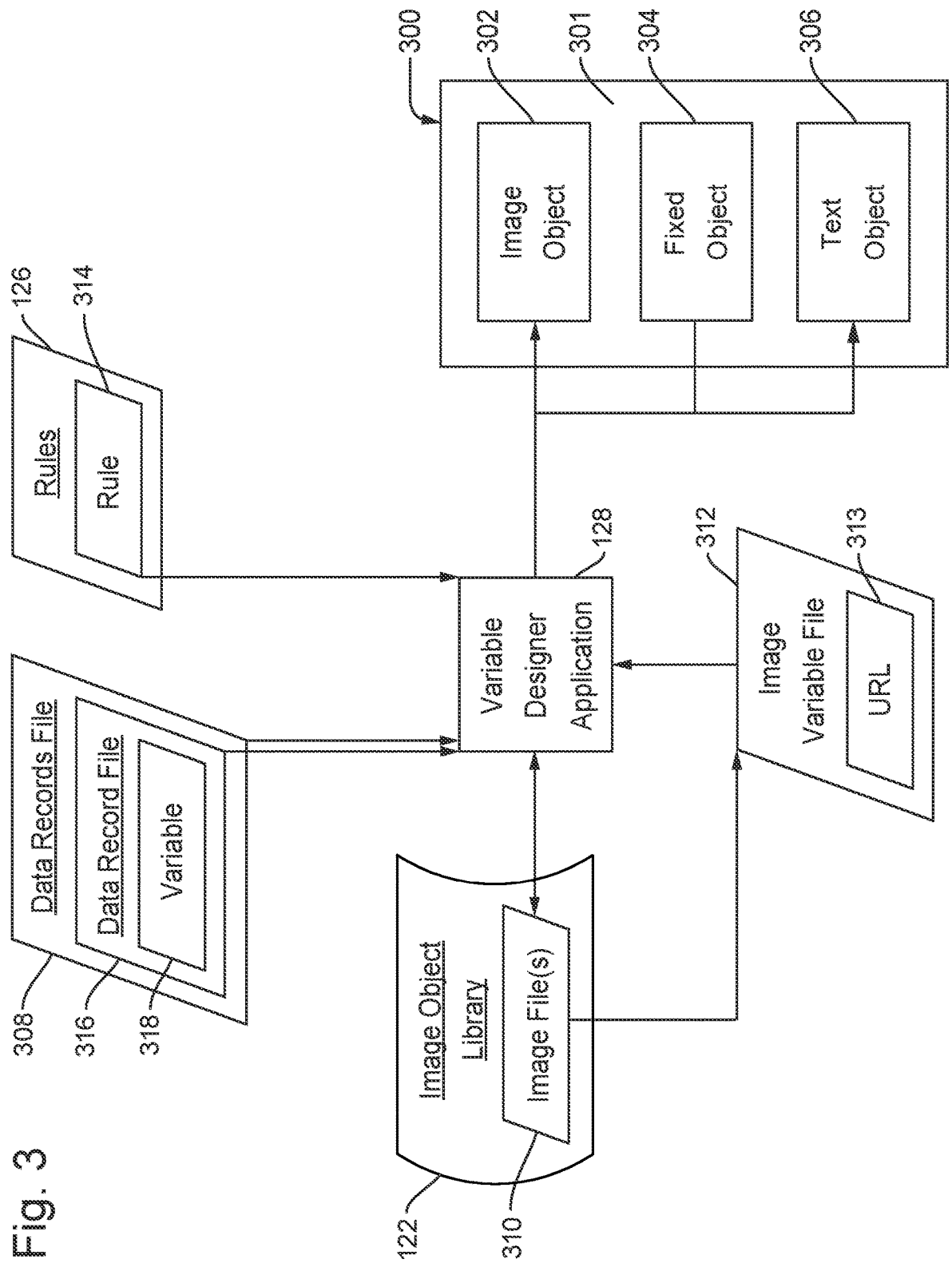
FIG. 3 illustrates an example document having an image object for use with variable data printing operations according to the disclosed embodiments.

FIG. 3 depicts an example document 300 having an image object 302 for use with variable data printing operations according to the disclosed embodiments. Document 300 may be a document for use in variable printing operations, such as a postcard, flyer, brochure, and the like. Document 300 may include a document template 301 that defines positions of image object 302, fixed object 304, and text object 306 within the document. Preferably, a large plurality of different versions of document 300 are generated where image object 302 and text object 306 may be variable and fixed object 304 is not. Different versions of document 300 may be created and generated based on the variable objects.

Image object 302 may be filled with one of a plurality of image files 310. As shown, variable designer application 128 may select one of the plurality of image files 310 to insert into image object 302. The selected image may be shown as image variable file 312. Image files 310 may be imported or obtained from image object library 122. Variable designer application 128 may not need every image within image object library 122, so that the user or selection process may select image files to place into document template 301. For example, image file 1, image file 2, image file 3, and image file 4 may be used to fill out document template 301 to generate document 300.

Document template 301 for document 300 may include fixed object 304. Fixed object 304 may be a fixed image used in every document 400 printed. Fixed object 304 also may be an image or text that provides information to the recipient of document 300, such as name of the sender, an address for the sender, a picture of a product, and the like.

Image variable file 312 may be selected from one of the plurality of image files 310. Which image is selected may be based on a variable 318 from a data record file 316 being used for this specific document. This feature is disclosed in greater detail below. Image variable file 312 also may be selected according to a defined rule 314 of rules 126. Image variable file 312 may include URL 313 that directs application 128 to a location of the associated image file to be placed in document 300.

Variable designer application 128 also may import data records file 308 to fill out other objects within document 300, such as text object 306. For example, data records file 308 may be names and addresses of potential customer list stored on client device 110 or print management server 108. Data record file 316 for each data file is provided to variable designer application 128 to generate document 300 using document template 301. As disclosed above, data record file 316 may include variable 318. For example, if variable 318 is "2," then image file 2 is selected to be placed in image object 302.

Image variable file 312 also may be selected according to a rule 314. Rule 314 may specify one or more conditions that need to be met in order to use a particular image file. When creating document template 301, the disclosed embodiments may define a rule stating that the selected image file for image object 302 correspond to an age of the person associated with record file 316. Thus, variable 318 is the person's age. Based on rule 314, one of plurality of image files 310 is provided. For example, if variable 318 is 33 and rule 314 specifies that image file 4 is used for addressees between the ages of 25-40, then image file 4 is provided as image variable file 312 to fill image object 302.

Using these features, the disclosed embodiments may select specific documents generated according to data records file 308, plurality of image files 310, and rule 314. The disclosed embodiments are interested in the different results from the application of these items by variable designer application 128. A document record will be added for each unique image file of plurality of image files 310. Thus, a document 300 will be generated and added to the preview set of records having image file 1, image file 2, image file 3, and image file 4.

Further, for each rule 314, a document 300 generated for each outcome of the rule will be added. In other words, a record of a document will be added for each condition of the rule. Further, if there are unique image files used, such as for fixed object 304, then a document having each unique image file should be added. Uniqueness may be based on the different URLs used to retrieve image files from image object library 122. Uniqueness should be evaluated using the complete image URL.

Figure 4:
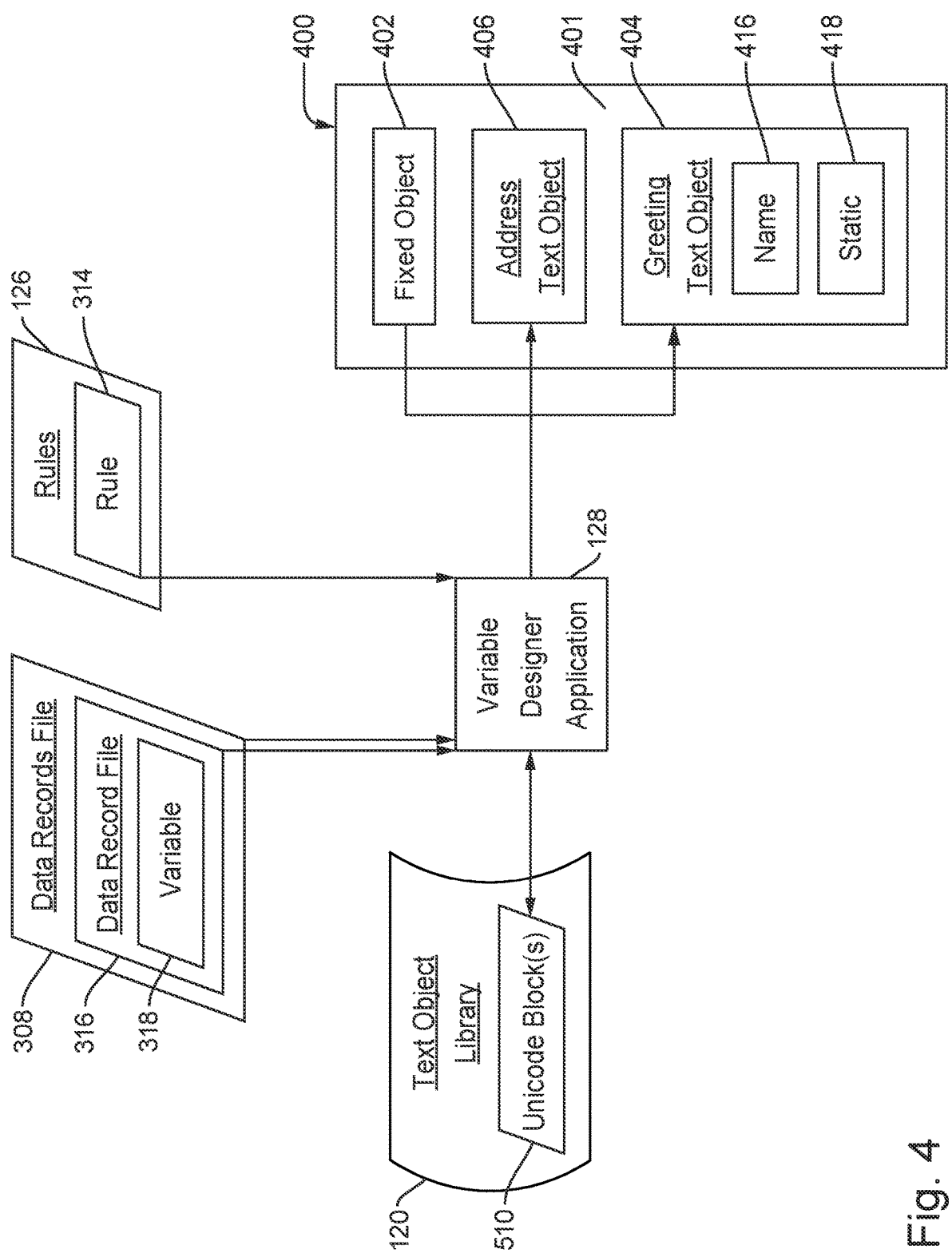
FIG. 4 illustrates an example document having text objects for use within variable data printing operations according to the disclosed embodiments.

FIG. 4 illustrates a document 400 having text objects 404 and 406 for use within variable data printing operations according to the disclosed embodiments. Document 400 may be a document for use in variable printing operations, such as a postcard, flyer, brochure, and the like. Document 400 may include a document template 401 that defines positions of fixed object 402 and text objects 404 and 406 within the document. Preferably, a large plurality of different versions of document 400 are generated where one of more text variables without text objects 404 and 406 are variable and fixed object 402 is not. Different versions of document 400 may be created and generated based on the variable objects.

As disclosed above, variable designer application 128 may process data, information, criteria, and rules to fill the objects within each document 400 according to document template 401. For document 400, variable designer application 128 may fill text objects 404 and 406 with different text variable data, such as names or address data. Text object 404 may be referred to as greeting text object 404, as it includes a greeting or suggestion. Text object 406 may be referred to address text object 406, as it includes text variables related to names and addresses within data records file 308. For text objects having text variables, there may be more than one variable as disclosed below. Fixed object 402 may be text, an image, a barcode, or the like, that is included in every document 400.

Greeting text object 404 includes text variable 416 and static text 418. Text variable 416 may be referred to as name text variable 416. Variable designer application 128 may fill name text variable 416 with the content, such as name information, provided in data record file 316 by one or more variables 318. Static text 418 may be text that is placed in every document 400 and provided with document template 401. Alternatively, it may be provided by text object library 120 if the user selects a pre-made format available to variable designer application 128. The size of the data within greeting text object 404 may vary as the names are different lengths. There may be a document with the longest record for name text variable 416 and a document with the shortest record of name text variable 416.

Figure 5:
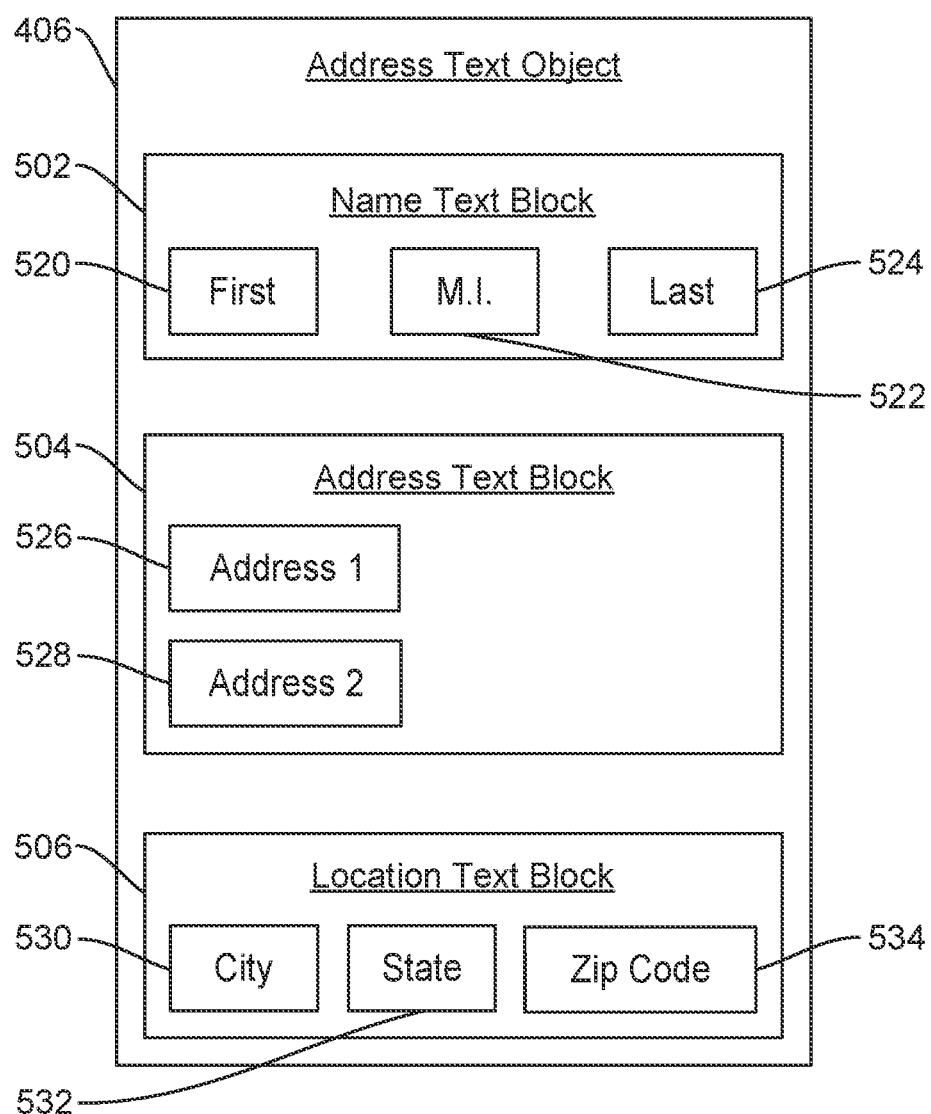
FIG. 5 illustrates a block diagram of an address text object according to the disclosed embodiments.

Address text object 406 may include several text variables, each having different data that is placed within the text object according to document template 401. Referring to FIG. 5, an example address text object 406 is shown according to the disclosed embodiments. Address text object 406 may include text blocks that further define sets of text variables for use within document 400. The text variables set forth the location for placement of the content of the data records in data records file 308 when generating each document for each record to go into VDP print job 113. Address text object 406 may include name text block 502 which include text variables for the name content in the records. For example, name text block 502 may include first name text variable 520, middle initial text variable 522, and last name text variable 524. Further, name text block 502 may be located at the top of address text object 406.

Address text block 504 also may be defined for use in address text object 406. Address text block 504 may be positioned or located below name text block 502. Address text blocks includes the content from the data records regarding an address, such as 1100 Miller St., Suite 690. For example, address text block 504 may include address 1 text variable 526 and address 2 text variable 528. Location text block 506 may include content regarding the location within a country, state, province, and the like. For example, location text block 506 may include city text variable 530, state text variable 532, and zip code text variable 534. Further, some text variables may not have any data, such as middle initial text variable 522 or address 2 text variable 528.

Referring back to FIG. 4, some text variables or static text may use Unicode blocks instead of standard Basic Latin text. For example, symbols such as !, @, #, $, %, &, *, (, ), [, ], and the like may be used for text within document 400. Thus, Unicode blocks 510 may be provided. Unicode blocks 510 may include Unicode block 1 and Unicode block 2 that is used to generate documents 500. When previews are generated, variable designer application 128 may access Unicode blocks 510 so that illegible data is not shown in the preview. The appropriate Unicode block is shown. Unicode blocks 510 for use with the disclosed embodiments may be stored at text object library 108.

Placement of text variables also may be subject to a rule 314 of rules 126 defined for the print job of documents 500. Rule 314 for text variables may state if no middle initial text variable 522 then first name text variable 520 and last name text variable 524 are placed next to each other, or, in other words, text variable 522 is removed. Another rule may define that if there is no data for address 2 text variable 528, then city text variable 530 and state text variable 532 are placed directly underneath address 1 text variable 526, or, in other words, address 2 text variable is removed within address text object 506.

Figure 6A:
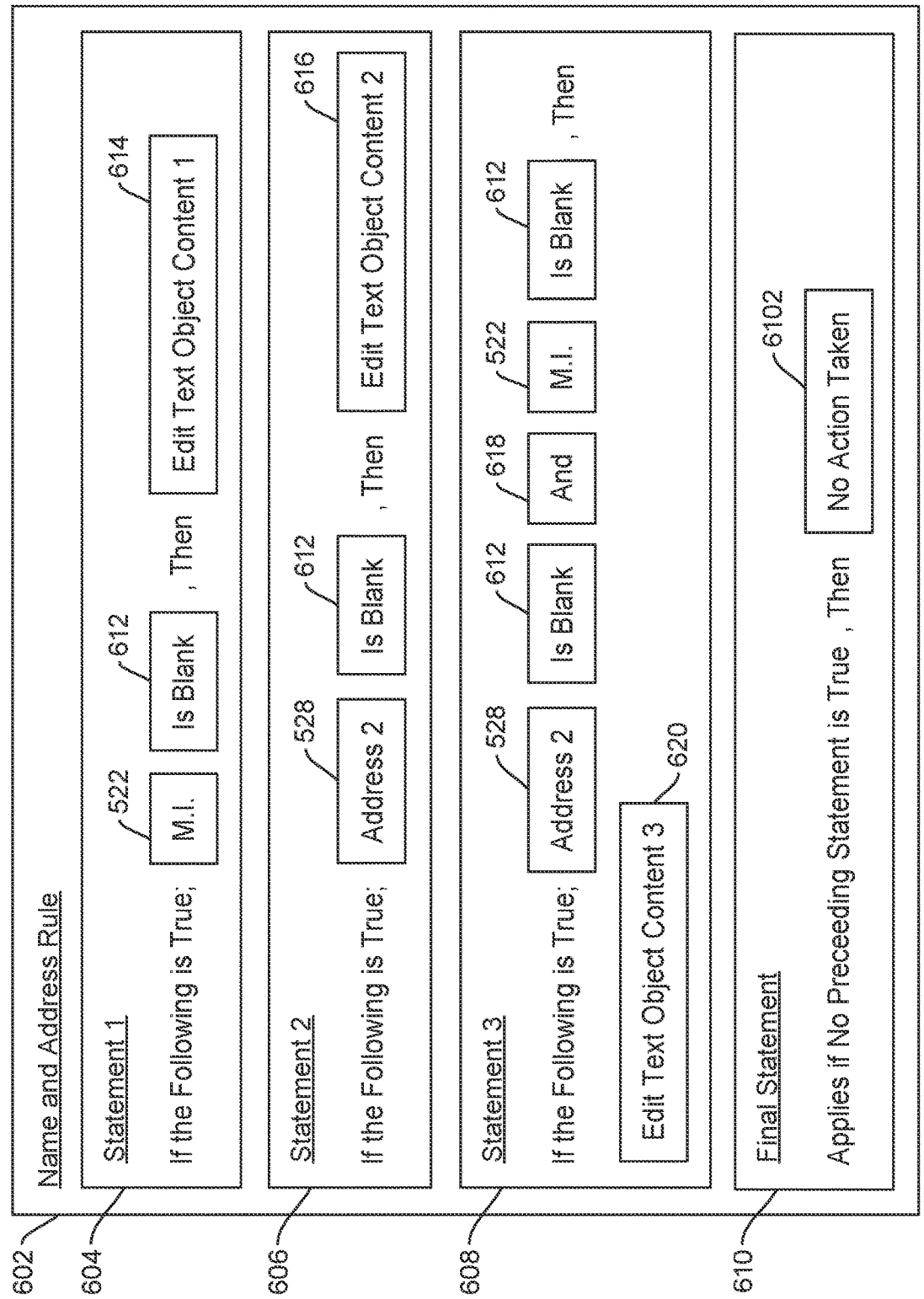
FIG. 6A illustrates an example of an implementation of a rule for text content and variables according to the disclosed embodiments.

FIG. 6A illustrates an example of an implementation of a complex rule for text content and variables according to the disclosed embodiments. FIG. 6A shows a rule 602 generated using statements 604, 606, 608, and 610, also shown as statement 1, statement 2, statement 3, and final statement, respectively. For illustrative purposes, reference may be made to document 400 and text objects 404 and 406, disclosed above. The statements make up the conditions to be met for implementation of the actions for the rule. Rule 602 may correspond to rule 314 disclosed above. After being generated, rule 602 may be stored with rules 126 for use with variable designer program 128 when creating the documents from the records for VDP print job 113.

Statements are created using variable designer application 128. A user may engage a graphical user interface (GUI) to define terms, variables, content, and conditions to be used in a statement. A statement may be generated to apply if no preceding statement is true. Thus, when rule 602 is applied to the content in data records file 308, the content and data may be examined to determine if any of the statements are true based on the content and data. If not, then final statement 610 is applied, which indicates an action 6102 of not taking any action with regards to the records in the corresponding document 400 being generated.

Statement 604 may define a condition based on middle initial text variable 522. Some names within data records file 308 may not include a middle initial. Thus, it may be desirable to format the created document for these records to not include a space for the middle initial. Thus, the user may define statement 604 to check if middle initial text variable 522 is blank in a record 316. Statement 604 includes a comparison 612 that indicates that variable designer application 128 should consider whether the middle initial text variable is blank, or there is no data or content for this variable in record 316.

If comparison 612 is true, then an action 614 is defined to be taken according to statement 604. Action 614 may edit text object content, text block content, text object style, or text block style. For example, action 614 may be to edit address text object 406 according to the content defined for the action. In this instance, action 614 may edit text object 406 to make text block 502 for the name into the following format:

| { First Name } { Last Name } |
| { Address 1 } |
| { Address 2 } |
| { City } { State } { Zip Code } |

If statement 604 is not true, then the application of rule 602 moves to statement 606. Statement 606 applies if no preceding statement is true. Statement 606 may define a condition based on address 2 text variable 528. Not every address content in data records file 308 includes a second line for the address. For example, the address may not include a suite, apartment, or post office box number. Thus, it may be desirable to format the created document for these records to not include the line for the second part of the address. Thus, the user may define statement 606 to check if address 2 text variable 528 is blank in a record 316. Statement 606 includes comparison 612 that indicates that variable designer application 128 should consider whether the address 2 text variable is blank, or there is no data or content for this variable in record 316.

If comparison 612 for statement 606 is true, then an action 616 is defined to be taken according to statement 606. Action 616 also may edit text object content, text block content, text object style, or text block style. For example, action 616 may be to edit address text object 406 according to the content defined for the action. In this instance, action 616 may edit text object 406 to make text block 504 for the address into the following format:

| { First Name } { M.I. } { Last Name } |
| { Address 1 } |
| { City } { State } { Zip Code } |

If statements 604 and 606 are not true, then the application of rule 602 moves to statement 606, which is a combination of the conditions set forth in the previous two statements. Comparison 618 may be added to statement 606 to define that both conditions of no middle initial and no address 2 content is found within record 316. Thus, comparison 618 may be an "AND" instruction. If middle initial text variable 522 and address 2 text variable 528 do not include content or data, then action 620 is taken. For example, action 620 may be to edit address text object 406 according to the content defined for the action. In this instance, action 620 may edit text object 406 to make text block 502 for the name and text block 504 for the address into the following format:

| { First Name } { Last Name } |
| { Address 1 } |
| { City } { State } { Zip Code } |

As disclosed above, if none of statements 604, 606, or 608 are true, then statement 610 is applied for rule 602. Statement 610 defines that action 6102 is taken, which is no action or no edits to the content of text object 406.

Thus, rule 602 provides a mechanism for a visually appealing text object 406 when certain content is missing from a record 316. Unsightly spaces or blanks are removed from the generated document. In other embodiments, the format of a variable may be changed to italics or to be underlined according to a statement.

Comparisons, such as comparisons 612 and 618, may include different expressions that are stringed together to define complex conditions in a statement. These expressions may include mathematical operators, such as =, >, <, and the like. The expressions for the comparisons also may include words or phrases to be used for the comparison, such as contains, does not contain, starts with, does not start with, ends with, does not end with, is blank, and is not blank. These expressions may be used with each other, such as disclosed by statement 606. For example, a statement may define the following condition:

{Last Name} {Begins with} {N} {AND} {Does not contain}{Jr} {AND} {Contains} {i}.

Once defined, rule 602 may be named and saved by variable designer application 128. For example, rule 602 may be named the "Name and Address Rule" and stored with rules 126 for application when running variable designer application 128 for data records file 308. Application of the Name and Address Rule will create VDP print job 113 with the middle initials removed and second address line removed, accordingly.

Figure 6B:
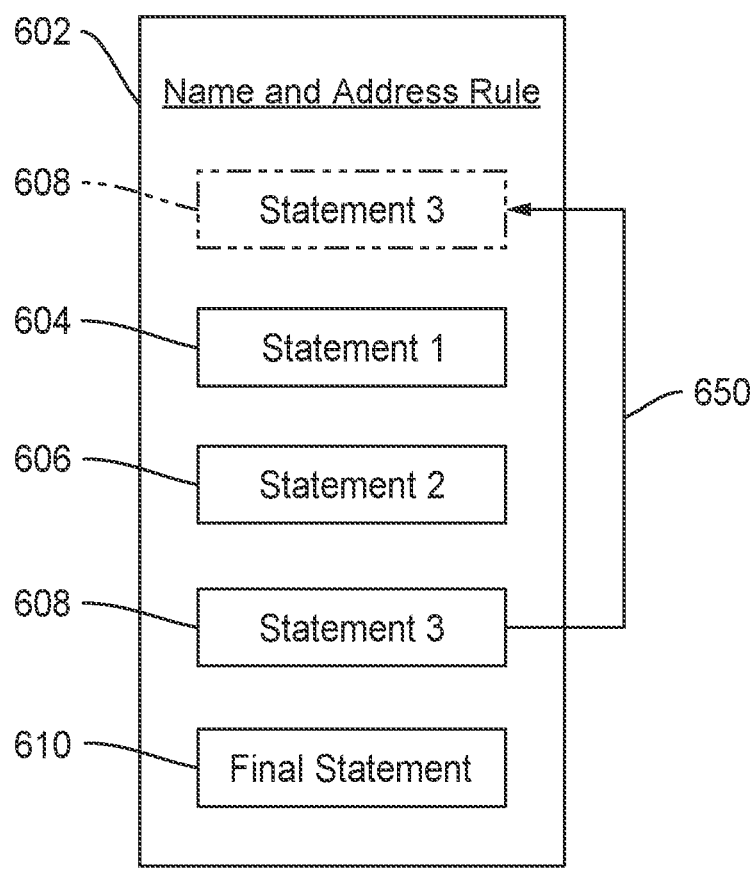
FIG. 6B illustrates a changed order of statements for the rule according to the disclosed embodiments.

The disclosed embodiments also provide for the restructuring of rule 602 with statements 602-608 for a better application process. For example, statement 608 being true will avoid the need for applying statements 604 and 606. Thus, statement 608 may be moved to the top of rule 602, as shown in FIG. 6B. Instruction 650 may move statement 608 from its position between statements 606 and 610 to be applied first, or before statement 604. Variable designer application 128 may allow statements to be moved as desired to define a preferred processing order for conditions in a rule. Final statement 610 should still be at the bottom of the rule, to be applied if none of the preceding statements are true.

Figure 7:
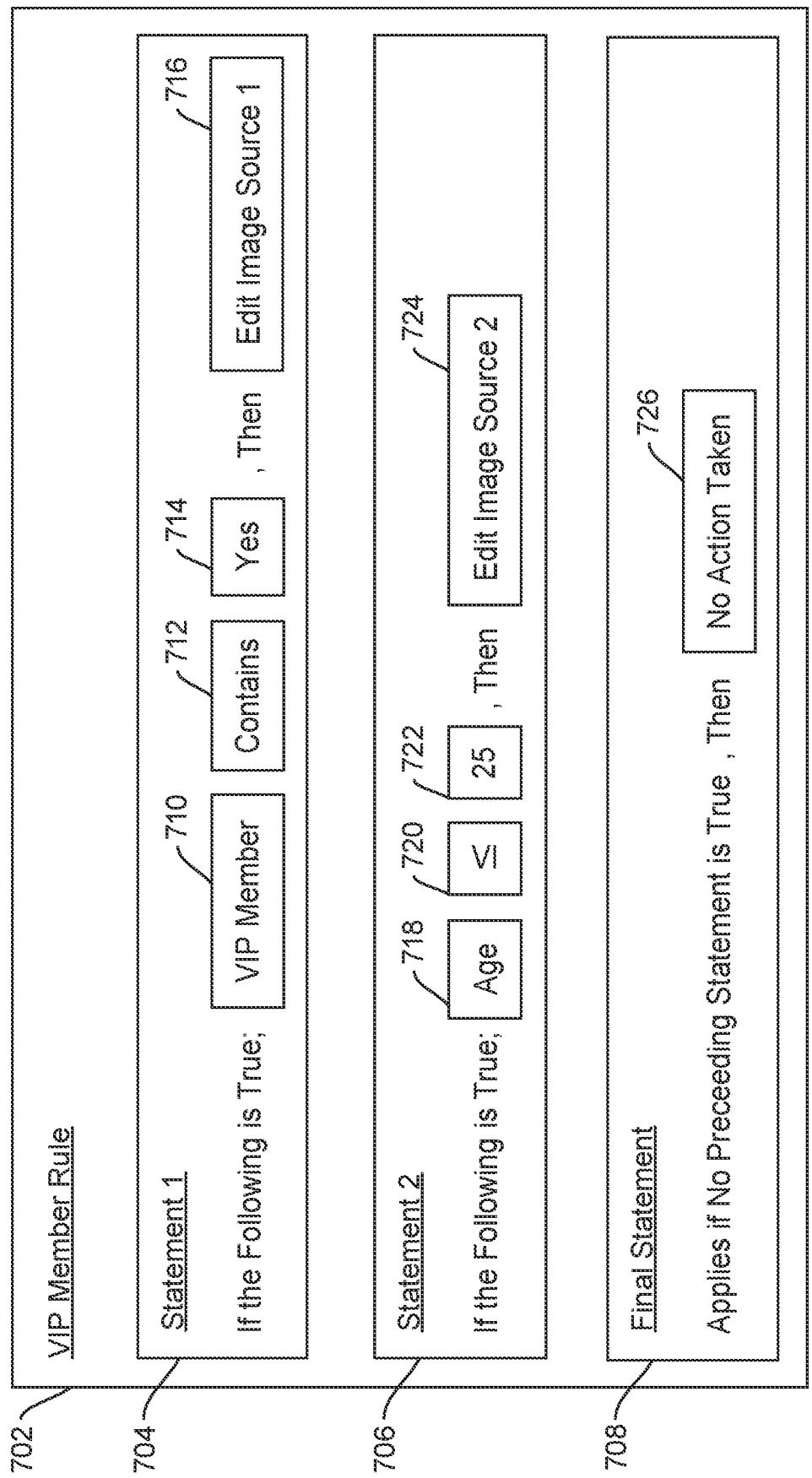
FIG. 7 illustrates an example of an implementation of a rule for image content and variables according to the disclosed embodiments.

FIG. 7 illustrates an example of an implementation of a complex rule for image content and variables according to the disclosed embodiments. FIG. 7 shows a rule 702 generated using statements 704, 706, and 610, also shown as statement 1, statement 2, and final statement, respectively. For illustrative purposes, reference may be made to document 300 and image object 302, disclosed above. The statements make up the conditions to be met for implementation of the actions for the rule. Rule 702 may correspond to rule 314 disclosed above. After being generated, rule 702 may be stored with rules 126 for use with variable designer program 128 when creating the documents from the records for VDP print job 113.

Statements 704 and 706 are generated similar to statements 604, 606, and 608, disclosed above. Except in this instance, variable designer application 128 may analyze variable 318 with record 316 as opposed to content in a field of the record. For example, variable 710 may correspond to variable 318 and define whether the records belongs to a VIP member. A VIP member may be entitled to extra benefits from the service using VDP print job 113. Thus, a VIP member field in record 316 may "Yes" or "No." Statement 704 uses comparison 712, which determines whether variable 710 contains value 714 of "Yes." Record 316 may include a Yes in the VIP member field for variable 710.

If so, then statement 704 instructs variable designer application 128 to retrieve an image file of image files 310 may a specified source. Thus, action 716 may edit the image source for image object 302 to a different URL or storage location used by variable designer application 128. Image object library 122 may include different images for use in generating VDP print job 113. Statement 704 changes the image source according to the condition defined in the statement. For example, a VIP member may receive an extra 20% discount for purchases made in relation to a sales campaign promoted by documents 300 printed by VDP print job 113. Image object 302 may include an image file 310 that includes a graphic indicating the extra 20% discount.

Statement 706 may be applied by rule 704 if any preceding statement is not true. Statement 706 may be directed to an age for the recipient of document 300 for the sales campaign. It may desired to provide a discount to younger potential customers. Thus, variable 718 may relate to the age provided in a field in record 316. Statement 706 defines that variable 718 for the age is subject to comparison 720 for value 722. For example, comparison 720 may be less than or equal to value 722 of 25. Thus, recipients of documents 300 that are 25 or younger are subject to action 724 of statement 706. Action 724 also may edit the image source for image object 302 to a different image than the one specified in action 716. This image file may include a different graphic announcing the promotion, or it may specify only a 10% discount.

Final statement 708 may apply to rule 702 if rules 704 and 706 are not true. As with final statement 610, this final statement specifies that action 726 is taken if none of the preceding statement are true. Action 726 specifies that no action be taken. In other embodiments, action 726 may include a third image source for another promotion graphic but with no discount.

Statements 704 and 706 also may be rearranged, but it may be preferable to keep the largest discounts at the top of rule 702 so that potential customers receive the biggest potential discount available to them based on the content and data in record 316. As the VIP member discount is 20% and the younger member discount is 10%, rule 702 should keep statements 704 and 706 is the order that they were generated.

Figure 8:
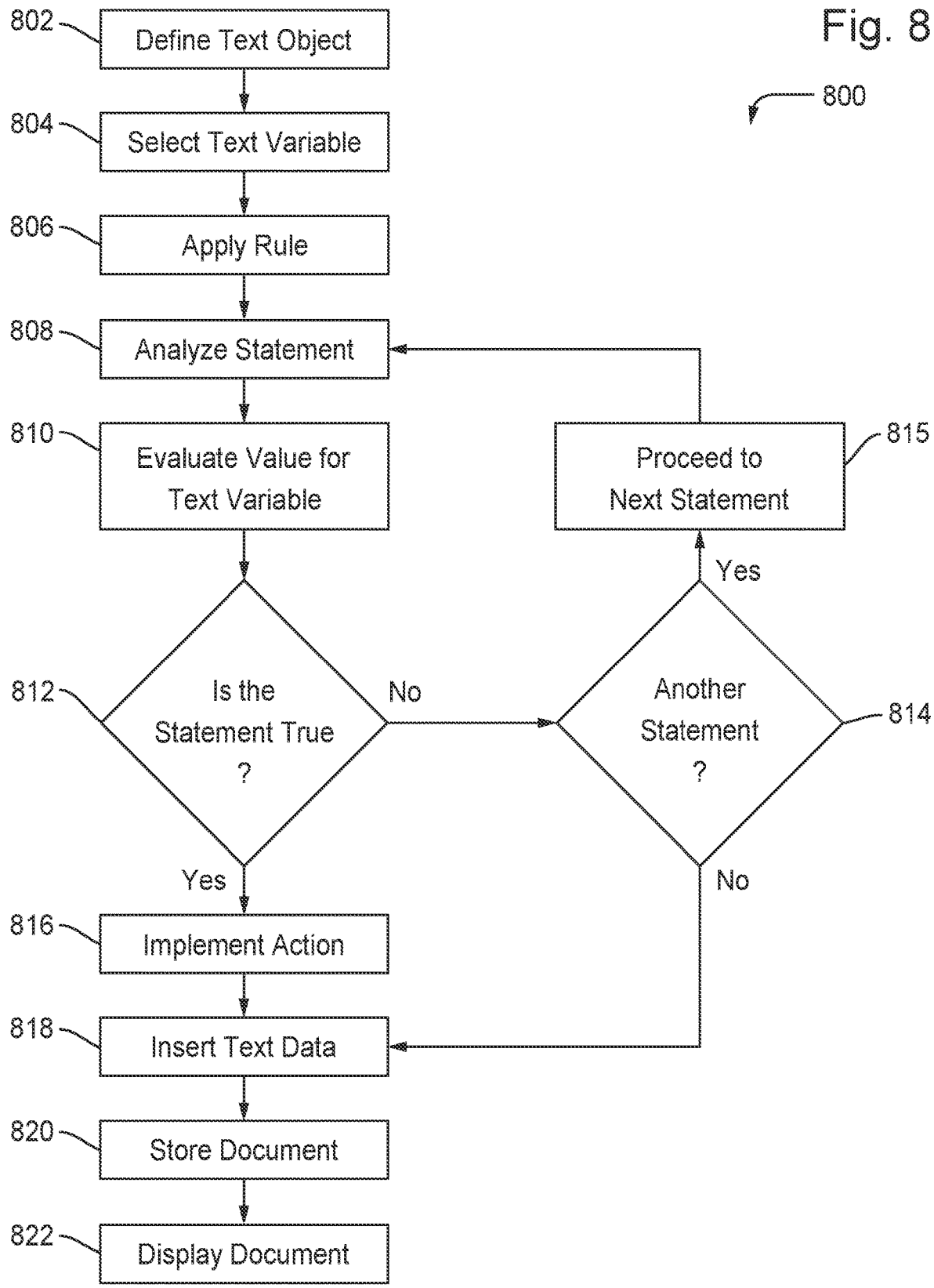
FIG. 8 illustrates a flowchart for implementing a rule for use with text variables in variable data printing operations according to the disclosed embodiments.

FIG. 8 depicts a flowchart 800 for implementing a rule 602 for use with text variables in variable data printing operations according to the disclosed embodiments. Flowchart 800 may refer to FIGS. 1-7 for illustrative purposes. Flowchart 800, however, is not limited to the embodiments disclosed by FIGS. 1-7.

Step 802 executes by defining a text object within document template 401 for a plurality of documents 400. The text object may be greeting text object 404 or address text object 406. For illustrative purposes, flowchart 800 will refer to address text object 406 for implementing a rule. As shown in FIG. 5, text object 406 includes text variables 520-534. The text variables dynamically change between each document 400 depending on the content provided in its corresponding record 316 of data records file 308.

Step 804 executes by selecting a text variable within text object 406 cited in rule 602. For example, middle initial text variable 522 may be cited in rule 602 and selected by the disclosed embodiments for review in application of the rule. Additional text variables also may selected due to being cited in the rule. Rule 602 may include a statement, such as statement 604, that defines a condition to be met with regard to the selected text variables.

Step 806 executes by applying rule 602 to the selected text variables within text object 406. Rule 602 may include one or more statements to apply. Step 808 executes by analyzing the statement to determine if the condition set forth therein is true. For example, statement 604 analyzes middle initial text variable 522 to determine if it is blank. The disclosed embodiments also may analyze other text variables as well, such as address 2 text variable 528 for statement 608. Step 810 executes by evaluating the value for the text variable according to the rule having the statement. Following the above example, the disclosed embodiments determine if middle initial text variable 522 for current record 316 is empty.

Step 812 executes by determining whether the statement is true. Thus, the disclosed embodiments will determine whether statement 604 is true based on the evaluation of the value for the text variable. Following the above example, it is determined whether middle initial text variable 522 for record 316 is blank, in accordance with comparison 612.

If step 812 is no, then step 814 executes by determining whether the rule includes another statement. If the current statement is false, then remaining statements are checked to determine if they are true. If step 814 is yes, then step 815 executes by proceeding to the next statement. For example, if statement 604 is false, then rule 602 will move to statement 606. Flowchart 800 proceeds back to step 808. If step 814 is no, then no further statements need to be evaluated and flowchart 800 proceeds to step 818, disclosed below.

If step 812 is yes, then step 816 executes by implement the action set forth in the statement. The action may be to modify the text object format for text object 406. The action may retrieve the modified format from rules 126 or other storage related to this print job by variable designer application 128. In other embodiments, the action may modify or edit the style of the text variable within the text object.

Step 818 executes by inserting text data or content according to the modified text object format into text object 406 for document 400 corresponding to record 316, is applicable. If flowchart 800 is coming from step 814, then the text data of record 316 is inserted without modification. As disclosed above, action 614 of statement 604 may modify text object 406 to not include middle initial text variable 522 so that there is not an extra space between first name text variable 520 and last name text variable 524. Step 820 executes by storing the generated document for with the rest of the documents generated for VDP print job 113. Step 822 executes by displaying the document with text object 406 including the text data or content for the text variables according to the modified text object format. For example, document 400 for record 316 is displayed without a middle initial for the recipient, if applicable.

Figure 9:
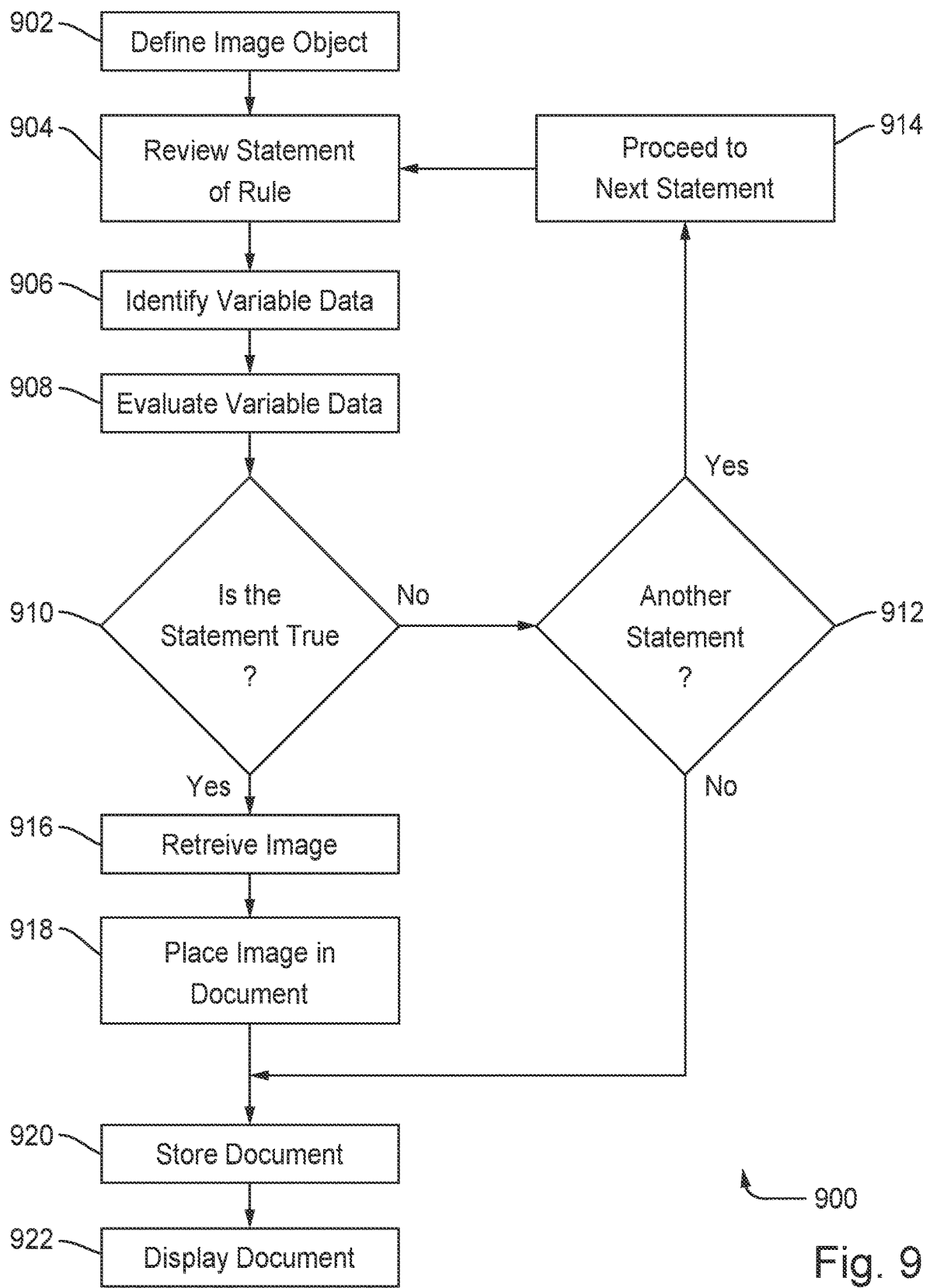
FIG. 9 illustrates a flowchart for implementing a rule for use with image variables in variable data printing operations according to the disclosed embodiments.

FIG. 9 depicts a flowchart 900 for implementing a rule 702 for use with image variables in variable data printing operations according to the disclosed embodiments. Flowchart 900 may refer to FIGS. 1-8 for illustrative purposes. Flowchart 900, however, is not limited to the embodiments disclosed by FIGS. 1-8.

Step 902 executes by defining an image object with an image placeholder within a document template for a plurality of documents. Referring to FIG. 3, image object 302 is defined for document 300 using document template 301. The document template may provide a graphic overlay or other designator as the image placeholder within the document. Step 904 executes by review statement 704 of rule 702 for image object 302. As disclosed above, statement 704 may be generated using variable designer application 128 when defining rule 702. In this instance, statement 704 sets forth a condition related to whether record 316 includes variable 318 indicating the recipient of the document is a VIP member.

Step 906 executes by identifying an image variable within a record 316 for the current document. The image variable may be the VIP member status of the record, or variable 710 in statement 704. In statement 706, the image variable may be variable 718 for age of the recipient associated with record 316. Step 908 executes by evaluating the image variable associated with the document according to rule 702, or, more specifically, statement 704. As disclosed above, the image variable differs between the plurality of documents as some records include a yes for VIP member variable 710 while others do not.

Step 910 executes by determining whether the condition set forth in statement 704 is true based on the value of the image variable. Using the above example, if value 714 of statement 704 is "yes" then the statement is true. Record 316 includes a VIP member variable 710 that contains a yes. If not, then the statement is false.

If step 910 is no, then step 912 executes by determining whether another statement is present in rule 702. Rules may include multiple statements so that complex rules may be defined according to the disclosed embodiments. If step 912 is yes, then step 914 executes by proceeding to the next statement. In this instance, rule 702 includes statement 706. Flowchart 900 proceeds back to step 904 to consider statement 706 and whether its condition is true. If step 912 is no, then flowchart 900 proceeds to step 920, disclosed below.

If step 910 is yes, then step 916 executes by retrieving an image file 310 related to rule 702. Referring to statement 704, action 716 may instruct variable designer application 128 to retrieve the appropriate image from a storage location, or image source 1. The image source for the image to be placed into document 300 may be a URL. Step 918 executes by placing the retrieved image into document 300 at a location defined by the image placeholder within document template 301. The image is not just placed anywhere in document 300 but were image object 302 is positioned.

Step 920 executes by storing document 300 with the image for record 316 along with the other documents generated for VDP print job 113. Step 922 executes by displaying document 300 with the retrieved image for review by the user. For example, if the image designed by the image source is a graphic for a 20% discount for VIP members, then that graphic is placed in documents 300 having VIP member variable 710 as yes. For those records not having a VIP status, no graphic is provided unless statement 706 is yes, in which another image may be placed in image object 302.

The disclosed embodiments, therefore, allow one to design different style of documents with various images. Images also may be changed at the storage location as needed without having to update application 128. Further, one may define complex rules as needed to produce the documents needed for a print job accurately and efficiently.

FIG. 10 depicts a flowchart 1000 for implementing a rule having multiple statements for variable data printing operations according to the disclosed embodiments. Flowchart 1000 may refer to FIGS. 1-9 for illustrative purposes. Flowchart 1000, however, is not limited to the embodiments disclosed in FIGS. 1-9.

Step 1002 executes by defining an object within a document template for a plurality of documents. The object is subject to a rule. Referring to the above-disclosed embodiments, image object 302 may be subject to rule 702 and address image object 406 may be subject to rule 602. Step 1004 executes by defining a statement for the rule for the object. The statement includes an expression for a condition regarding a variable defined in the object. The variable relates to content within data records for generating the plurality of documents. Examples of statements may be statements 604, 606, 608, 704, and 706, disclosed above. Statements may be defined to be true or false. Step 1006 determines whether an additional statement is to be defined. If yes, then flowchart 1000 proceeds back to step 1004 to define another statement.

If step 1006 is no, then step 1008 executes by modifying the rule, if applicable. The order of the statements defined for the rule may be moved such that a certain statement is considered first. Alternatively, a statement may be moved below other statements to be considered after another condition. Step 1009 executes by saving the rule by variable designer application 128. The rule may be named and saved for later use when preparing the VDP print job using the data records. For example, the rule may be saved in client device 110 or at rules 126.

Step 1010 executes by starting the generation of the plurality of documents having the defined object and variables identified in the statements of the rule. Data file records 308 may be uploaded into variable designer application 128 or other application to generate the documents to be part of VDP print job 113 sent to printing device 104.

Step 1012 executes by applying the rule for each record 316. The defined object is associated with the rule and calls the rule when filling the object with content, such as text or an image. Step 1014 executes by applying the defined statement within the rule. If the rule includes multiple statements, then the first statement is applied unless step 1018 has been executed. As disclosed above, a statement includes a condition that is either true or false based on the value of the variable being used in the object. The value is related to content within the specific record.

Step 1016 executes by determining whether the applied statement is true. Examples of statements being true are disclosed above with reference to FIGS. 8 and 9. If step 1016 is no, then the statement is false and any action defined in the statement will not be taken. Step 1018 executes by determining whether the rule includes another statement to consider if the current one is not true. If yes, then flowchart 1000 proceeds back to step 1014 to apply the next statement. If step 1018 is no, then flowchart 1000 proceeds to step 1024, disclosed below.

If step 1016 is yes, then step 1020 executes by implementing an action set forth in the statement based on the condition. Examples of actions are disclosed above. The format of the object may be modified or different contact placed in the object as a result of the action. Thus, step 1022 executes by modifying the data or content placed in the object based on the action implemented by the statement.

Step 1024 executes by generating the document corresponding to the record used in the preceding steps for the plurality of documents. Step 1026 executes by storing the document with the plurality of documents. Step 1028 executes by displaying the document for viewing with the object having the modified content or modified format according to the rule.

It should be noted that steps 1012-1028 may be executed for every record being used to generate VDP print job 113. Some print jobs may include thousands of documents, each generated based on the content in the records. As such, not every document may be displayed. The disclosed embodiments may implement further rules or processes to limit the displayed documents.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-us able program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non- exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for variable data printing operations, the method comprising:
    defining a text object within a document template for a plurality of documents, wherein the text object includes a first text variable that dynamically changes between the plurality of documents;
    evaluating a value for the first text variable according to a text object rule having a first statement;
    evaluating a value for a second text variable for the text object according to a second statement of the text object rule;
    changing an order of the first statement and the second statement of the text object rule;
    implementing an action to modify a text object format for the text object according to the first statement based on the value for the first text variable;
    inserting text data according to the modified text object format into the text object for the document; and
    displaying the document with the modified text object including the text data according to the modified text object format.

2. The method of claim 1, further comprising storing the document having the text object with the modified text object format within the plurality of documents.

3. The method of claim 1, further comprising retrieving the text data from a record having a plurality of entries for text data.

4. The method of claim 1, further comprising generating the first statement for the text object rule using a condition for the first text variable.

5. The method of claim 4, further comprising comparing the condition to the value for the first text variable.

6. The method of claim 1, further comprising evaluating the value for the first text variable according to a second statement of the text object rule.

7. A method for variable data printing operations, the method comprising: defining an object within a document template for a plurality of documents, wherein the object is subject to a rule;
    defining a first statement of the rule, the first statement having a first expression for a condition regarding a first variable defined in the object, wherein the first variable relates to content within data records for generating the plurality of documents;
    defining a second statement of the rule, the second statement having a second expression for a condition regarding a second variable defined in the object;
    for each record, applying the first statement of the rule to content for the first variable within each record of the data records;
    for each record, implementing a first action according to a result of the application of the first statement of the rule, wherein the first action modifies content placed in the object or a format of the object for a document corresponding to the record; and
    applying the second statement of the rule to content for the second variable within each record of the data records if the condition for the first statement is not true.

8. The method of claim 7, wherein defining the first statement of the rules includes the first statement having a second expression for the condition regarding the first variable defined in the object.

9. The method of claim 7, further comprising modifying the rule such that the second statement is applied before the first statement.

10. The method of claim 7, for each record, implementing a second action according to a result of the application of the second statement of the rule, wherein the second action modifies content placed in the object or a format of the object for a document corresponding to the record in a manner different than the first action.

* * * * *